United States Patent Office 3,174,849
Patented Mar. 23, 1965

3,174,849
TWO-STAGE OXIDATION AND LEACHING PROCESS
Vladimir Nicolaus Mackiw and Vasyl Kunda, both of Fort Saskatchewan, Alberta, Canada, assignors to Sherritt Gordon Mines Limited, Toronto, Ontario, Canada, a company of Ontario, Canada
No Drawing. Filed Oct. 5, 1961, Ser. No. 143,061
5 Claims. (Cl. 75—115)

This invention relates to a hydrometallurgical process for the extraction of non-ferrous metal values from metal-bearing material. The invention is particularly directed to providing a process in which desired non-ferrous metal values are extracted from the metal bearing material and are dissolved in an acid leach solution.

Hydrometallurgical processes for extracting desired non-ferrous metal values from metal bearing material and for dissolving them in a leach solution are well known and are in commercial use. Recently, there have been developed processes in which oxidizable non-ferrous metal values contained in metal bearing material are extracted and dissolved in a leach solution by leaching the material with an acid or basic leach solution at elevated temperature and pressure in the presence of a free oxygen containing gas. Such processes possess important advantages insofar as is concerned the rate and the efficiency of the extraction and dissolution of desired non-ferrous metal values.

There is an important problem in known processes involving the oxidation of non-ferrous metal-sulphur bearing materials with a strongly acid leach solution in the presence of a free oxygen bearing gas. It has been considered that there must be at least sufficient sulphur present in the mixture of solids and solution subjected to the oxidizing reaction to combine with the desired non-ferrous metal values as sulphates. In treating sulphur deficient material, it usually is necessary to adjust the sulphur content of the mixture subjected to the oxidizing reaction to provide the sulphur necessary for the reaction.

There is also a problem in the treatment of non-ferrous metal bearing material which contains sulphur in large excess of that required to combine with desired non-ferrous metal values as sulphates. At a temperature within the range of from about 200° to 300° F., sulphide sulphur tends to oxidize to elemental sulphur in a strongly acid leach solution more rapidly than the non-ferrous metal values are oxidized to sulphate form. If the oxidation is conducted above the melting point of sulphur, elemental sulphur is present in the slurry as liquid sulphur globules which have an affinity for unoxidized sulphide particles to the extent that an appreciable percentage of such particles become occluded in or attached to particles of elemental sulphur. As a result, the sulphur particles must be treated for the recovery of occluded non-ferrous metal particles to avoid the loss of desired non-ferrous metal values. Alternatively, the formation and accumulation of elemental sulphur in the reaction mixture can be overcome by conducting the reaction at a temperature above about 350° F. but this is an acid forming reaction and has the disadvantage that costly, high temperature, high pressure, corrosion resistant equipment is required.

There is a further problem in the treatment of metal bearing material which contains less sulphur than that required to combine with the non-ferrous metal values as sulphates. It is necessary to provide sulphur with such materials either prior to or during the acid oxidation treatment. This addition of sulphur as such or in sulphur bearing materials tends to form, as stated above, elemental sulphur pebbles or increase the acidity beyond desired limits, depending on the temperature at which the acid oxidation is conducted. Thus, the blending of sulphur deficient material with material which contains an excess of sulphur prior to leaching does not provide a solution to the problem of the formation of elemental sulphur or sulphuric acid depending on the temperature at which the oxidation reaction is conducted.

We have found that the problem of leaching certain types of non-ferrous metal-sulphur bearing material, which contains less sulphur than that required to combine with the non-ferrous metal values as sulphates, can be overcome by conducting the oxidation reaction in two stages. In the first stage, finely divided particles of the non-ferrous metal bearing material are dispersed in water and the resulting slurry is reacted at a temperature above about 300° F. under a partial pressure of oxygen of at least about 10 pounds per square inch. The oxidation treatment is continued until substantially all the desired non-ferrous metal values are converted to the form of hydroxides or other basic metal salts.

The slurry produced in the oxidation step is cooled to a temperature below about 212° F. and the pressure is relieved. Acid is then added to the slurry, preferably in only slight excess of the amount necessary to dissolve the non-ferrous metal values as sulphates. The slurry is agitated and digested at a temperature below about 212° F. until dissolution of non-ferrous metal values is complete. Undissolved residue is separated from the solution and the solution can then be treated by conventional or unconventional methods for the recovery of the dissolved non-ferrous metal values.

Types of metal bearing materials from which the most satisfactory results are obtained in the operation of the process of the present invention are those which form basic salts which are soluble in aqueous sulphuric acid solution. Such non-ferrous metal compounds include, but are not necessarily restricted to cuprous sulphide, nickel sub-sulphide, $Ni_3S_2$, and artificially produced materials which contain non-ferrous metals but in which there is insufficient sulphur present to combine the non-ferrous metal as sulphates. The non-ferrous metal values may be present, for example, in materials such as matte, speiss and chemical precipitates. However, it is found that when sulphide sulphur is present in the metal bearing material subjected to treatment, the aqueous oxidation step proceeds rapidly with substantially complete oxidation of the non-ferrous metal values. The following leaching step then can be conducted at a temperature below about 212° F. with a very high extraction and dissolution of desired non-ferrous metal values within a relatively short period of time.

Factors which affect the rate and the efficiency of the aqueous oxidizing reaction, in addition to the presence of sulphide sulphur, are temperature, partial pressure of oxygen, size of the metal bearing particles and the constitution of the metal bearing material.

When using water as the aqueous slurrying medium, the oxidation reaction may proceed too slowly at temperatures below about 300° F. for economically practical operation. If acid is added to the slurry, sulphide sulphur tends to oxidize to elemental sulphur at temperatures within the range of from about 200° to about 300° F. The problem of corrosion of mild and stainless steel equipment becomes serious in reacting a slurry which contains a considerable concentration of free acid with a free oxygen bearing gas at a temperature above about 300° F. Thus, the slurrying medium employed is essentially water or an aqueous medium which contains such minor amounts of acid as would not produce a pH below about 2.5 during the course of the oxidation reaction. The oxidizing reaction is conducted at a temperature within the range of from about 300° to about 500° F. Higher temperatures can be employed, of course, but their use would involve the use of costly, high pressure equipment which is not warranted by the value, if any, of the increased rate of oxidation. A preferred temperature is within the range of from about 350° F. to about 450° F.

The partial pressure of oxygen is determined to provide a relatively rapid rate of oxidation without involving the use of high pressure equipment. Oxygen can be supplied as such or in air or oxygen enriched air. Preferably, it is supplied to the reaction vessel continuously during the course of the reaction. Very satisfactory results are obtained in the use of an oxygen partial pressure within the range of from about 10 to about 100 pounds per square inch. If air is used as the oxidizing agent and the reaction is conducted at a temperature within the range of from about 350° F. to about 450° F. under a partial pressure of oxygen of about 10 pounds per square inch, a total pressure of from about 185 to about 475 pounds per square inch is produced. Conventional mild or stainless steel autoclaves can be employed under total pressures below about 600 pounds per square inch and the temperature and pressure at which the reaction is conducted can be readily determined to provide a satisfactory rate of oxidation safely within the limits of conventional low pressure equipment. Also, as the slurry contains no free acid, difficulties resulting from corrosion are minimized if they are not altogether eliminated.

The size of the metal bearing particles preferably should be smaller than about 500 microns. Oxidation of non-ferrous metal values having a particle size smaller than about 500 microns proceeds rapidly and the undissolved residue from the succeeding leaching step can be separated without difficulty from the solution, such as by filtration. An important factor in the rate of oxidation is the surface area of the particles exposed to the liquid and oxidizing gas. The rate of oxidation increases as the size of the particles of the charge is reduced.

The constitution of the metal bearing material is important. If sulphur is present, for example as sulphide, there is a tendency to form sulphuric acid under the strongly oxidizing conditions. There is no particular problem in this provided that sulphuric acid is not formed or provided in the solution in excess of that required to combine with the desired non-ferrous metal values as sulphates. If sulphur is present in the metal bearing solution in excess of the amount necessary to combine with the desired non-ferrous metal values, the material can be leached directly and the sequence of separate oxidation and leaching steps of the present process is not necessary.

On completion of the oxidation step, the slurry is cooled to a temperature below about 212° F. Sulphuric acid is added in slight excess of the amount necessary to combine with the oxidized, non-ferrous metal values to form sulphates which are soluble in the solution. The slurry is agitated and digested at a temperature below about 212° F. for a time sufficient to dissolve the acid soluble, oxidized, non-ferrous metal values. Undissolved residue is separated from the pregnant leach solution, such as by filtration, and the solution can then be treated for the recovery of the dissolved non-ferrous metal values.

The following examples illustrate the operation of the process of this invention. All percentages are by weight unless otherwise indicated.

*Example 1*

200 grams of an ore concentrate contained 49.9% copper; 15.6% sulphur; 2.6% cobalt; 1.2% iron and minor amounts of calcium, magnesium and silicon. This concentrate was ground to a fineness of 95% minus 150 mesh standard Tyler screen. The particles of concentrates were dispersed in sufficient water to produce a slurry containing about 20% solids. The slurry was heated to a temperature of about 400° F. and reacted with a stream of oxygen in amount sufficient to produce a partial pressure of oxygen of 30 pounds per square inch. The oxidation reaction was continued for 6 hours during which the pH value of the solution was between 3.1 and 7. At the end of the oxidation period, the slurry was cooled to atmospheric temperature and sufficient sulphuric acid was added to form soluble sulphates of the oxidized copper and cobalt values. In this particular example, approximately 31.2 grams of sulphur were available in the concentrate; 52.7 grams of sulphur were necessary to satisfy the requirements of the copper and cobalt contents of the slurry; and it was thus necessary to supply 21.5 grams of sulphur, in the form of 70 grams of sulphuric acid, to the leaching step. Usually, a small excess over the stoichiometric requirement is added to ensure dissolution of all the oxidized non-ferrous metal values. The slurry was digested, with agitation, for four hours. At the end of the high temperature oxidation step, about 80% of the copper and 95% of the cobalt were dissolved in the solution. At the end of the acid leaching step, 99.9% copper and 99.6% cobalt originally contained in the metal bearing material were dissolved in the leach solution.

*Example 2*

Example 1 was repeated with the difference that a solution which contained 24 g.p.l. copper; 16 g.p.l. cobalt; 0.9 g.p.l. iron; and 9 g.p.l. free sulphuric acid, was employed as the slurrying medium in the oxidation step. The oxidation step was conducted under the conditions of Example 1. The solution, at the end of the oxidation step, had a pH value of 2.7. A slightly smaller amount of sulphuric acid than was required in Example 1 (stoichiometrically 61 g.p.l.) was added to the leaching step. The low temperature leaching step was conducted under the conditions of Example 1. After separation of the solid residue, the solution contained an excess of 99% of the copper and cobalt contents of the concentrate. The small amount of the insoluble residue which amounted to about 22% by weight of the original metal bearing material contained only 0.30% copper and 0.03% cobalt.

Example 3 illustrates the results of leaching the metal bearing material treated in Examples 1 and 2 directly without subjecting the material to a preliminary high temperature oxidation step.

*Example 3*

100 grams of concentrate of the same composition as that of Example 1 were ground to a fineness of about 96% minus 150 mesh screen and dispersed in one litre of a solution which contained 57.5 g.p.l. sulphuric acid to form a slurry. The slurry was heated to 275° F. and was reacted with oxygen at a partial pressure of about 30 pounds per square inch provided by a stream of oxygen fed continuously into the reaction vessel during the reaction. The reaction was continued for 7 hours during which the pH value of the solution dropped to 1.2. 7.5 grams of elemental sulphur pebbles which analyzed 36.5% copper; 2.94% cobalt and 46% sulphur were produced. Of the metal values in the ore concentrate, 94% of the copper and 87.6% of the cobalt were dissolved in the leach solution at the end of the leaching period.

A comparison of the results obtained in Examples 1 and 2 with those obtained in Example 3 illustrate the improved results which can be obtained by the process of this invention in the extraction of oxidizable non-ferrous metal values from metal bearing material which contains sulphide sulphur in amount less than that required to combine with the non-ferrous metal values as sulphates.

It will be understood that modifications can be made in the preferred embodiments of the invention described above without departing from the scope of the invention defined by the appended claims.

What we claim as new and desire to protect by Letters Patent of the United States is:

1. The method of extracting oxidizable non-ferrous metal values from "non-ferrous" metal bearing material which contains sulphide sulphur in amount less than that required to combine with the non-ferrous metal values as sulphates which comprises the steps of dispersing particles of said "non-ferrous" metal bearing material in an aqueous medium selected from the group consisting of water and dilute aqueous acid solution having a pH value above about pH 2.5, to form a slurry, the total sulphur content of said slurry being less than that required to combine with the non-ferrous metal values as sulphates, reacting said slurry at a temperature above about 300° F. and under a partial pressure of oxygen above about 10 pounds per square inch with a free oxygen bearing gas, continuing the oxidizing reaction to oxidize substantially all the oxidizable non-ferrous metal values contained in the "non-ferrous" metal bearing material, cooling the resulting slurry and adding sulphuric acid thereto in amount sufficient to combine with oxidized non-ferrous metal values as sulphates, digesting the acidified slurry with agitation at a temperature below about 212° F., continuing the digestion step with agitation to dissolve acid soluble, oxidized non-ferrous metal values contained in the solids fraction of said slurry, separating undissolved residue from the slurry, and treating the resulting solution for the recovery of dissolved non-ferrous metal values.

2. The method according to claim 1 in which the oxidation step is conducted at a temperature within the range of from about 350° F. to about 450° F.

3. The method of extracting oxidizable non-ferrous metal values selected from the group consisting of copper, nickel and cobalt from "non-ferrous" metal bearing material which contains sulphide sulphur in amount less than that required to combine with the non-ferrous metal values as sulphates which comprises the steps of dispersing particles of said "non-ferrous" metal bearing material in an aqueous medium selected from the group consisting of water and dilute aqueous acid solution having a pH value above about pH 2.5, to form a slurry, the total sulphur content of said slurry being less than that required to combine with the non-ferrous metal values as sulphates, reacting said slurry at a temperature above about 300° F. and under a partial pressure of oxygen above about 10 pounds per square inch with a free oxygen bearing gas, continuing the oxidizing reaction to oxidize substantially all the oxidizable non-ferrous metal values contained in the "non-ferrous" metal bearing material, cooling the resulting slurry and adding sulphuric acid thereto in amount sufficient to combine with oxidized non-ferrous metal values as sulphates, digesting the acidified slurry with agitation at a temperature below about 212° F., continuing the digestion step with agitation to dissolve acid soluble, oxidized non-ferrous metal values contained in the solids fraction of said slurry, separating undissolved residue from the slurry, and treating the resulting solution for the recovery of dissolved non-ferrous metal values.

4. The method of extracting oxidizable, non-ferrous metal values from "non-ferrous" metal bearing material which contains sulphide sulphur in amount less than that required to combine with the non-ferrous metal values as sulphates which comprises the steps of dispersing particles of said "non-ferrous" metal bearing material in water to form a slurry, reacting said slurry at a temperature above about 300° F. and under a partial pressure of oxygen above about 10 pounds per square inch with a free oxygen bearing gas, continuing the oxidizing reaction to oxidize substantially all the oxidizable non-ferrous metal values contained in the metal bearing material, cooling the "non-ferrous" resulting slurry and adding sulphuric acid thereto in amount sufficient to combine with oxidized non-ferrous metal values as sulphates, digesting the acidified slurry with agitation at a temperature below about 212° F., continuing the digestion step with agitation to dissolve acid soluble, oxidized non-ferrous metal values contained in the solids fraction of said slurry, separating undissolved residue from the slurry, and treating the resulting solution for the recovery of dissolved non-ferrous metal values.

5. The method of extracting oxidizable non-ferrous metal values from "non-ferrous" metal bearing material which contains sulphide sulphur in amount less than that required to combine with the non-ferrous metal values as sulphates which comprises the steps of dispersing particles of said "non-ferrous" metal bearing material in a dilute aqueous acid solution having a pH value above about pH 2.5 to form a slurry, the total sulphur content of said slurry being less than that required to combine with the non-ferrous metal values as sulphates, reacting said slurry at a temperature above about 300° F. and under a partial pressure of oxygen above about 10 pounds per square inch with a free oxygen bearing gas, continuing the oxidizing reaction to oxidize substantially all the oxidizable non-ferrous metal values contained in the "non-ferrous" metal bearing material, cooling the resulting slurry and adding sulphuric acid thereto in amount sufficient to combine with oxidized non-ferrous metal values as sulphates, digesting the acidified slurry with agitation at a temperature below about 212° F., continuing the digestion step with agitation to dissolve acid soluble, oxidized non-ferrous metal values contained in the solids fraction of said slurry, separating undissolved residue from the slurry, and treating the resulting solution for the recovery of dissolved non-ferrous metal values.

References Cited in the file of this patent

UNITED STATES PATENTS

| | | |
|---|---|---|
| 1,364,573 | Moore | Jan. 4, 1921 |
| 2,588,265 | McGauley | Mar. 4, 1952 |
| 2,746,859 | McGauley et al. | May 22, 1956 |